United States Patent
Nene

(10) Patent No.: US 9,705,403 B2
(45) Date of Patent: Jul. 11, 2017

(54) APPARATUS AND METHOD FOR SELECTIVE AND ADAPTIVE SLOPE COMPENSATION IN PEAK CURRENT MODE CONTROLLED POWER CONVERTERS

(71) Applicant: Texas Instruments Incorporated, Dallas, TX (US)

(72) Inventor: Hrishikesh Ratnakar Nene, Katy, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 898 days.

(21) Appl. No.: 13/775,180

(22) Filed: Feb. 23, 2013

(65) Prior Publication Data

US 2014/0239935 A1    Aug. 28, 2014

(51) Int. Cl.
*H02M 3/158*  (2006.01)
*H02M 3/156*  (2006.01)
*H02M 1/00*  (2006.01)
*H02M 1/38*  (2007.01)

(52) U.S. Cl.
CPC .......... *H02M 3/1588* (2013.01); *H02M 3/156* (2013.01); *H02M 2001/0032* (2013.01); *H02M 2001/385* (2013.01); *Y02B 70/1466* (2013.01); *Y02B 70/16* (2013.01)

(58) Field of Classification Search
CPC ....... G05F 3/02; H02M 3/1588; H02M 3/156; H02M 2001/385; H02M 2001/0032; H02M 2001/335; Y02B 70/1466; Y02B 70/16

USPC ........................................................ 323/304
See application file for complete search history.

(56) References Cited

U.S. PATENT DOCUMENTS

| | | | | |
|---|---|---|---|---|
| 3,675,047 | A * | 7/1972 | Vahlstrom | H03K 5/05 327/176 |
| 3,920,907 | A * | 11/1975 | Mullen, Jr. | H04B 1/46 704/214 |
| 6,894,461 | B1 * | 5/2005 | Hack | G05F 1/70 307/82 |
| 7,397,230 | B2 * | 7/2008 | Tabaian | H02M 1/08 323/222 |
| 9,041,375 | B2 * | 5/2015 | Costa | 323/283 |
| 2009/0167398 | A1 * | 7/2009 | Oishi et al. | 327/261 |
| 2010/0327835 | A1 * | 12/2010 | Archibald | 323/282 |
| 2011/0115458 | A1 * | 5/2011 | Schafmeister | H02M 3/156 323/284 |

FOREIGN PATENT DOCUMENTS

GB    2045566    * 10/1980

* cited by examiner

*Primary Examiner* — Fred E Finch, III
*Assistant Examiner* — Lorena Bruner
(74) *Attorney, Agent, or Firm* — John R. Pessetto; Charles A. Brill; Frank D. Cimino

(57) ABSTRACT

An apparatus and a method for selective and adaptive slope compensation in peak current mode controlled power converter are disclosed. The selective and adaptive slope compensation in peak current mode controlled power converter is implemented by hardware, software, and/or combination of both to carry out start of a pulse width modulated period and delay of a start of slope compensation by a first time from the starting of the pulse width modulated period.

16 Claims, 2 Drawing Sheets

US 9,705,403 B2

APPARATUS AND METHOD FOR SELECTIVE AND ADAPTIVE SLOPE COMPENSATION IN PEAK CURRENT MODE CONTROLLED POWER CONVERTERS

FIELD

The present disclosure relates to digital integrated circuits, and, more particularly, to an apparatus and a method for selective and adaptive slope compensation in digital integrated circuits implementing peak current mode control.

BACKGROUND

A peak current mode control (PCMC) is a control scheme for power converters enabling, in theory, certain desirable advantages like voltage feed forward, automatic cycle by cycle current limiting and other advantages known to persons skilled in the art. To implement this PCMC control scheme in practice, precisely controlled pulse width modulated (PWM) waveforms to drive control switches in power converters are essential. These power converters often employ a peak current reference without or with a slope compensation. The peak current reference is compared with a current sensed at the output of the power converter; the result of the comparison controlling the PWM waveform.

FIG. 1 depicts a conceptual block diagram of a digitally controlled PCMC based power converter system 100. A power converter 102 receives at its input an input voltage $V_{in}$ from a source 104 and provides at its output a regulated voltage $V_{out}$ to a load 106. To accomplish the $V_{out}$ regulation, the $V_{out}$ feedback is provided to block 108 comprising an analog-to-digital (ADC) converter, which digitizes the $V_{out}$ feedback, which is then provided to a first input of a block 110 comprising a comparator and a voltage controller (not shown). A digital reference voltage $V_{ref}$ from a reference voltage source 112 is provided to a second input of the block 110. The digitized $V_{out\_d}$ feedback and the digital reference voltage $V_{ref}$ are compared by the comparator and the result of the comparison is provided to the voltage controller. Based on the comparison, the voltage controller generates voltage $V_{comp}$, which is provided at the output of the voltage controller 110 and serves to derive a peak current reference signal $I_{pref}$.

It is well known by persons of ordinary skills in the art that PCMC based power converter systems suffer from stability issues and sub-harmonic oscillations for operation above 50% duty cycle theoretically. A duty cycle is the time that the PWM waveform spends in an active state in proportion to the pulse width modulated period. Consequently, the PCMC based power converter systems may implement a slope compensation. The slope compensation can be applied to the peak current $I_{peak}$, decrementing the peak current $I_{peak}$ by a ramp thus arrive at a slope compensated peak current reference signal $I_{pref}$. Alternatively, the slope compensation may be achieved by keeping the peak current $I_{peak}$ constant and increment a feedback current $I_{fb}$ by the ramp.

As depicted in FIG. 1, the feedback current $I_{fb}$ is sensed at a node of converter 102 dependent on a topology of power converter, means of controlling the converter, and other design criteria known to persons skilled in the art. By means of example, the feedback current may be a current through the load 106, it could be a current through an inductor, transformer primary current, and other nodes known to persons skilled in the art.

For clarity of explanation of the different aspects the slope compensated peak current reference signal $I_{pref}$ is used; however, the disclosed concepts are equally applicable to the case where the slope compensation ramp is added to the feedback current $I_{fb}$.

The generation of a slope compensated peak current reference signal $I_{pref}$ is carried out by a block 114, comprising a digital-to-analog (DAC) converter, for converting the digital representation of the voltage $V_{out}$ provided by the voltage controller 114 to an analog representation corresponding to a peak current $I_{peak}$, and a ramp generator which generates a slope for compensation taking the value of the a peak current $I_{peak}$ as initial value for the ramp generator.

The slope compensated peak current reference signal $I_{pref}$ is provided to a first input of a block 116. The second input of the block 116 is provided with a feedback current $I_{fb}$ corresponding to a sensed current in the power converter 102. The block 116 comprises a comparator (not shown), which compares the slope compensated peak current reference signal $I_{pref}$ with the feedback current $I_{fb}$, and the result of the comparison affects various attributes of the PWM waveforms PWM(1)-PWM(n) generated by a PWM generator (not shown) of the block 116 and provided to the power converter 102.

Although as described above, blocks 108, 110, 114, 116, and 112 comprise a digital PCMC controller 101, persons skilled in the art would understand that not all the blocks need to be implemented in the digital PCMC controller 101. By means of an example, the slope compensation, block 114 may or may not be implemented in the digital PCMC controller 101. Likewise, the comparator, described as a part of block 116, may be external to the digital PCMC controller 101. The digital PCMC controller 101 may optionally be interfaced with or reside inside a digital controller 117, e.g., a Microcontroller, Digital Signal Processor, and any other digital controller known to persons of ordinary skills in the art. The digital controller 117 may be utilized to program various attributes of the PWM waveforms and the slope for compensation; therefore, imparting more intelligence to the system and an ability to adaptively adjust to changing conditions for optimum digitally controlled PCMC based power converter system 100 performance.

The different implementation of the digital PCMC controller 101 may provide a different number of the PWM waveforms in accordance with a proposed use of a particular digital PCMC controller 101. However, it is understood by persons of ordinary skills in the art that not all the waveforms need to be generated and provided to the power converter. Thus, by means of an example a buck power converter may require a single PWM waveform, a synchronous buck power converter may require two PWM waveforms, an isolated phase shifted full bridge direct-current-to-direct-current (DC-DC) converter with synchronous rectification may require six waveforms, and the like.

One technique for avoiding shoot-through provides deadtime, i.e., a time difference between the turn-off of the first switch to the turn-on of the second switch, and vice versa and is explained in reference to FIG. 2, which depicts a conceptual schematics of a synchronous buck power converter along with waveforms of interest 200.

Referring to FIG. 2A, a power supply 204 provides an input voltage $V_{in}$ to the synchronous buck power converter 202. As well known in the art, the circuitry of a synchronous buck converter comprises an (optional) input capacitor 202_1 to smooth a potential variation of the input voltage $V_{in}$, a pair of switches 202_2 and 202_3 that enable charge and discharge the inductor 202_4/capacitor 202_5 combination; thus regulating the output voltage $V_{out}$, which is provided to the load 206.

The switches 202_2 and 202_3 are driven by two PWM waveforms generated by a PWM waveform generator, e.g., the PWM waveform generator 116 of FIG. 1 (not shown in FIG. 2A). Such a PWM waveform generator must generate the two PWM waveforms such that the switches 202_2 and 202_3 are prevented to be turned on at the same time. One technique for preventing the switches 202_2 and 202_3 from being turned on at the same time provides dead-time, i.e., a time difference between the turn-off of switch 202_2 to the turn-on of switch 202_3, and vice versa and is explained in reference to FIG. 2B depicting an amplitude as a function of time of selected waveforms. Further details regarding the dead-time can be found in a application, U.S. Ser. No. 13/775,154, entitled "APPARATUS AND METHOD FOR A PROGRAMMABLE DEAD-TIME IN PEAK CURRENT MODE CONTROLLED POWER CONVERTERS", filed on even date herewith, and assigned to the assignee of the instant application.

Referring to FIG. 2B, at time $t_0$, which marks an end of a previous PWM period and a start of a new PWM period, the slope compensated peak current reference signal $I_{pref}$ 224, is reset to a peak current value $I_{peak}$ and a ramp is decremented from the a peak current value $I_{peak}$ for the slope compensation. At the same time, the first PWM waveform 218 is reset from an amplitude $A_{1\_2}$ to an amplitude $A_{1\_1}$; thus, causing switch 202_3 of FIG. 2A, to open. The feedback current $I_{fb}$ 222 keeps decreasing.

After a first dead-time $DT_1$, i.e., at time $t_1$, the second PWM waveform 220 is set from an amplitude $A_{2\_1}$ to an amplitude $A_{2\_2}$; thus, causing switch 2022 of FIG. 2A, to close; thus causing the feedback current $I_{fb}$ 222 to start increasing until reaching the limit set by the slope compensated peak current reference signal $I_{pref}$ 224 at time $t_2$, when the second PWM waveform 220 is reset from the amplitude $A_{2\_2}$ to an amplitude $A_{2\_1}$; the reset causing switch 2022 of FIG. 2A, to open, thus causing the feedback current $I_{fb}$ 222 to start decreasing.

After a second dead-time $DT_2$, i.e., at time $t_3$, the first PWM waveform 218 is set from the amplitude $A_{1\_1}$ to the amplitude $A_{1\_2}$; thus, causing switch 202_3 of FIG. 2A, to close; thus keeping the feedback current $I_{fb}$ 222 decreasing.

At time $t_4$ the PWM period ends, the first PWM waveform 218 is reset from an amplitude $A_{1\_2}$ to an amplitude $A_{1\_1}$, the slope compensated peak current reference signal 224, is reset to a peak current value and the PWM period is repeated.

Considering FIG. 2B, it can be observed that when the slope compensation is implemented, the slope starts decrementing at the start of the each PWM cycle from the peak current value $I_{peak}$. Furthermore, a first dead-time $DT_1$ also occurs at the start of the PWM cycle. Therefore, since the peak current reference command is decremented at the start of the each PWM cycle, thus even during the first dead-time $DT_1$, the value of the slope compensated peak current reference signal $I_{pref}$ 224 may be close to or equal to a zero value at the time when the second PWM waveform 220 is set from the amplitude $A_{2\_1}$ to an amplitude $A_{2\_2}$ at the end of the first dead-time $DT_1$. Such an event may occur when the PCMC based power converter system is operating at low loads or low duty cycles. Consequently, the ability of the PCMC controller to control the system operation under low load conditions suffers and that some part of the DAC range may not be utilized for control. Moreover, a low slope compensated peak current reference signal $I_{pref}$ 224 at the end of the first dead-time $DT_1$ increases the possibility of spurious reset of the second PWM waveform 220 immediately after $DT_1$ because of switching noise resulting from the second PWM waveform 220 being set from the amplitude $A_{2\_1}$ to an amplitude $A_{2\_2}$.

On the other hand, when the slope compensation ramp is added to the feedback current $I_{fb}$ 222, instead of subtracting from the peak current $I_{peak}$, a similar effect/result may be observed.

Consequently, there is a need in the art to avoid this incorrect and undesirable situation in power converters.

SUMMARY

In one aspect of the disclosure, an apparatus and a method for selective and adaptive slope compensation in peak current mode controlled power converters according to appended independent claims is disclosed. Preferred additional aspects are disclosed in the dependent claims.

BRIEF DESCRIPTION OF THE DRAWINGS

The foregoing aspects described herein will become more readily apparent by reference to the following description when taken in conjunction with the accompanying drawings wherein.

DETAILED DESCRIPTION

Figure 1:
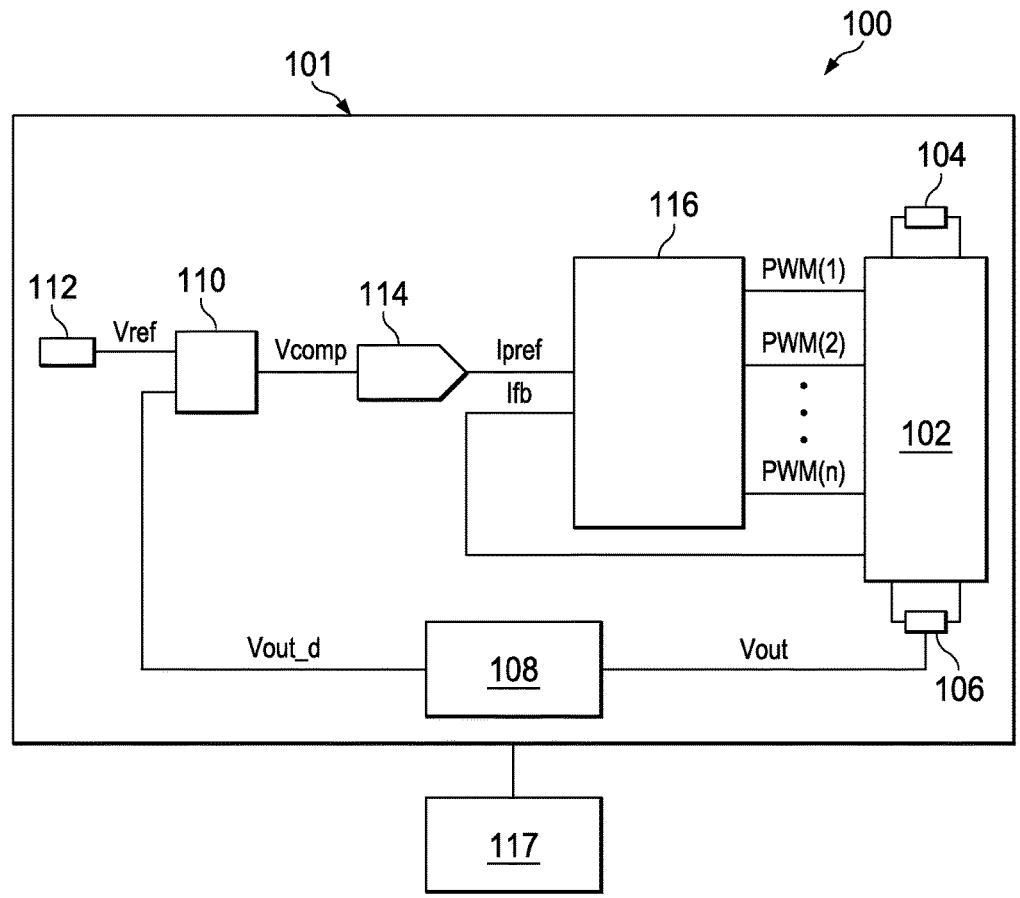
FIG. 1 depicts a conceptual block diagram of a digitally controlled PCMC based power converter system according to known concepts.
Figure 2A:
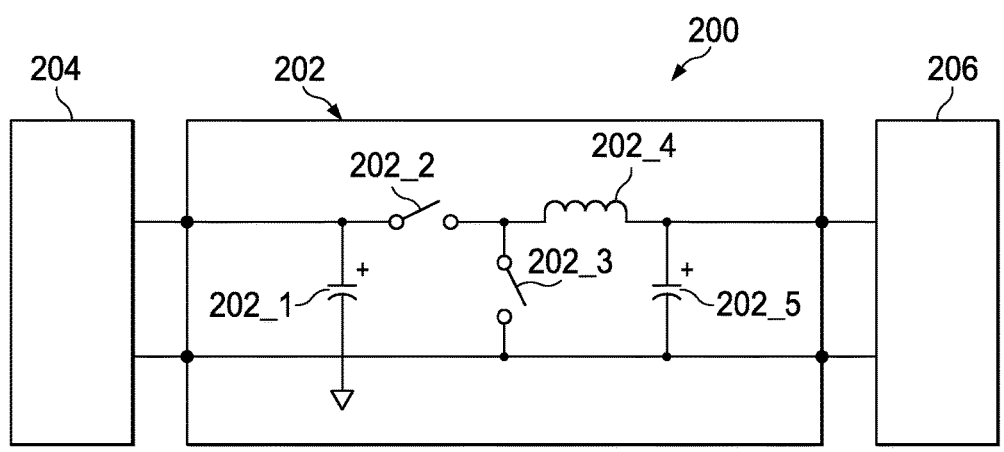
FIG. 2A depicts a conceptual schematics of a synchronous buck power converter according to known concepts.
Figure 2B:
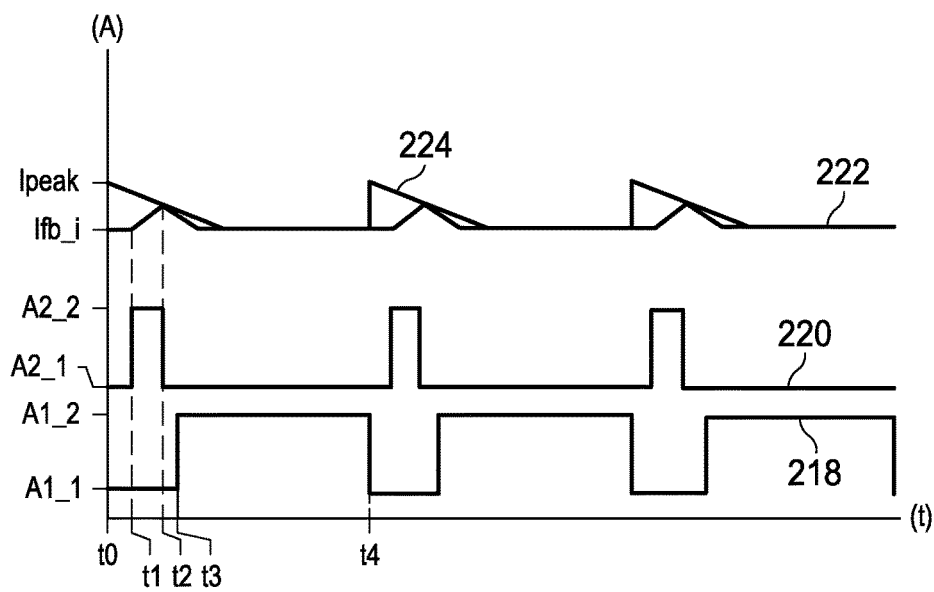
FIG. 2B depicts the synchronous buck power converter's waveforms of interest according to known concepts.

Various aspects of the present invention will be described herein with reference to drawings that are schematic illustrations of idealized configurations of the present invention. As such, variations from the shapes of the illustrations as a result, for example, manufacturing techniques and/or tolerances, are to be expected. Thus, the various aspects of the present invention presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Various disclosed aspects may be illustrated with reference to one or more exemplary configurations. As used herein, the term "exemplary" means "serving as an example, instance, or illustration," and should not necessarily be construed as preferred or advantageous over other configurations disclosed herein.

To achieve more reliable control of the PWM waveforms, and, consequently, the power converter especially when operating under low load or low duty cycle conditions, start of the slope compensation ramp can be delayed by an amount at least equal to $DT_1$ from the start of the PWM cycle.

Figure 3:
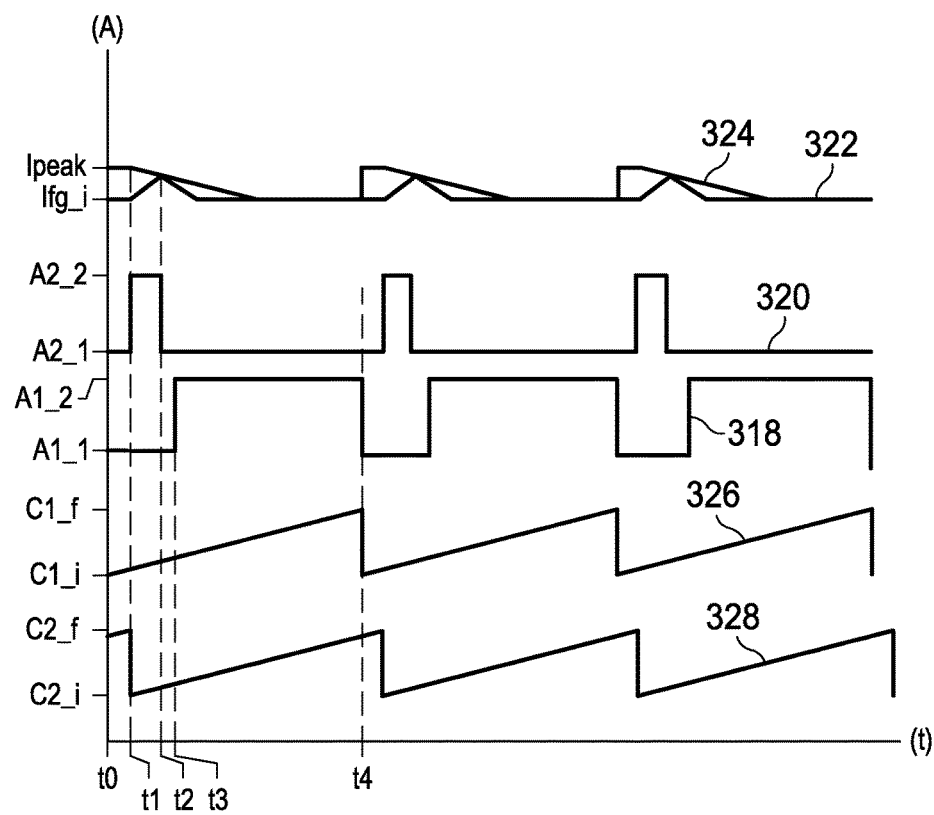
FIG. 3 depicts PWM waveforms generated by a PWM generator along with other waveforms of interest.

FIG. 3 depicts PWM waveforms generated by a PWM generator along with other waveforms of interest according to aspects of this disclosure. For clarity of explanation of the different aspects, an exemplary power converter, e.g., the synchronous buck converter described supra, is assumed without any loss of generality. However, it is understood that the aspects can be applied to any power converter.

Reference 326 denotes a representation of a first timer counter counting from an initial value $C_{1\_i}$, stored in a first register for the first timer counter, to a final value $C_{1\_f}$ stored in a second register for the first timer counter, of a PCMC controller, e.g. the PCMC controller 101 of FIG. 1 (not shown). Although any value may be used as the initial value $C_{1\_i}$, the initial value $C_{1\_i}$ is usually set to zero. The difference between the initial value $C_{1\_i}$ and the final value $C_{1\_f}$ comprises a value of a PWM period required to achieve a desired PWM frequency. The first counter 326 is started at time $t_0$, which marks an end of a previous PWM period and a start of a new PWM period. At this time, the slope compensated peak current reference signal $I_{pref}$ 324, is reset to a peak current value $I_{peak}$ and is held constant at a peak current value $I_{peak}$. At the same time, the first PWM waveform 318 is reset from an amplitude $A_{1\_2}$ to an amplitude $A_{1\_1}$. The feedback current $I_{fb}$ 322 stays at an initial value $I_{fb\_i}$.

Reference 328 denotes a representation of a second timer counter counting from an initial value $C_{2\_i}$, stored in a first register for the second timer counter, to a final value $C_{2\_f}$ stored in a second register for the second timer counter, of the PCMC controller. Although any value may be used as the initial value $C_{2\_i}$, the initial value $C_{2\_i}$ is usually set to zero. The difference between the initial value $C_{2\_i}$ and the final value $C_{2\_f}$ comprises a value of the PWM period. The second timer counter 328 is synchronized with the first timer counter 326 with a phase lag offset equal to the value of desired delay of a slope compensated peak current reference signal $I_{pref}$ 324. The phase lag offset may be changed by changing a value of a register. As depicted in FIG. 3, the delay is equal to a first dead-time $DT_1$.

After an expiration of a first dead-time $DT_1$, i.e., at time $t_1$, the second PWM waveform 320 is set from an amplitude $A_{2\_1}$ to an amplitude $A_{2\_2}$, and in response, the power converter. e.g., the power converter 102, of FIG. 1 (not shown) causes the feedback current $I_{fb}$ 322 to increase. The second timer counter 328 reaches the final value $C_{2\_f}$ and is reset to start counting anew from the initial value $C_{2\_i}$. The second timer counter 328 reset causes the slope compensated peak current reference signal $I_{pref}$ 324 to start decreasing from the peak current value $I_{peak}$ according to the compensation slope.

At time $t_2$ the feedback current $I_{fb}$ 322 reaches the limit set by the slope compensated peak current reference signal $I_{pref}$ 324; the event causing reset of the second PWM waveform 320 from the amplitude $A_{2\_2}$ to an amplitude $A_{2\_1}$ and in response, the power converter causes the sensed current through the load $I_{fb}$ 322 to start decreasing.

After an expiration of a second dead-time $DT_2$, i.e., at time $t_3$, the first PWM waveform 318 is set from the amplitude $A_{1\_1}$ to the amplitude $A_{1\_2}$ and in response, the power converter keeps the feedback current $I_{fb}$ 322 decreasing.

At time $t_4$ the first timer counter 326 reaches the final value $C_{1\_f}$, which marks the expiration of the current PWM period, the first PWM waveform 318 is reset from an amplitude $A_{1\_2}$ to an amplitude $A_{1\_2}$, the slope compensated peak current reference signal $I_{pref}$ 324, is reset to a peak current value $I_{peak}$ and a next PWM period is started.

A person skilled in the art will understand that there are different approaches to generate the delay. By means of an example, a delay-dedicated digital timer counter timer may delay the start decrease of the slope compensated peak current reference signal $I_{pref}$ 324 from the peak current value $I_{peak}$ according to the compensation slope. Again, the delay, equal to the first dead-time $DT_1$, may be changed by a change of a register for the delay-dedicated digital timer counter.

As disclosed in FIG. 3 and associated text, the delay of the slope compensated peak current reference signal $I_{pref}$ 324 is set equal to the required first dead-time $DT_1$. However, it is understood that any value may be used. By means of an example, consider the above-mentioned well understood property of PCMC based power converter system that PCMC based power converter systems suffer from stability issues and sub-harmonic oscillations for operation above 50% duty cycle theoretically. Since the slope compensation is not needed when the PCMC based power converter system operates below the duty cycle at which the instability and the sub-harmonic oscillations occur; the delay of the compensated peak current reference signal $I_{pref}$ 324 may be set to at least the value equal to the duty cycle at which the instability and the sub-harmonic oscillations occur. The value of the duty cycle at which the instability and the sub-harmonic oscillations occur depends on a particular implementation of the PCMC based power converter systems and can be analyzed and established by a theoretical analysis, experimentally, or by other analysis methods known to persons skilled in the art. By means of an example, practical values of the duty cycles may vary between 40% and 50% of a duty cycle.

As understood by persons of ordinary skills in the art, the dead-time may be adjusted based on operating conditions to assure optimal operation of the power converter. Such operating conditions may comprise load condition characterized by, e.g., the value of the load, current through the load, power delivered to the load, and other characteristics known to a person skilled in the art, may be determined. The load condition may be determined, e.g., based on the sensed current through the load, duty cycle of the first PWM waveform, and/or other parameters known to a person skilled in the art. By means of an example, in cases, in which it is desirable that the slope compensation is delayed at least by the value of the first dead-time DT1, the slope compensation delay may be adjusted in accordance with adjustment of the first dead-time DT1. Since, as described supra, the phase lag offset of the first timer counter 326 may be changed by a value of a register, the amount of the delay of the first timer counter 326 may be adjusted by simply programming a register to adapt to changing operating conditions and dead-time requirements. This provides a highly flexible solution.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various aspects of this disclosure are provided to enable one of ordinary skill in the art to practice the present invention. Modifications to various aspects of a presented throughout this disclosure will be readily apparent to those skilled in the art, and the concepts disclosed herein may be extended to other applications. Thus, the claims are not intended to be limited to the various aspects of the wave shaping circuitry presented throughout this disclosure, but are to be accorded the full scope consistent with the language of the claims. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for selective and adaptive slope compensation comprising:
providing a first timer counter, in a peak current mode controlled power converter, counting from a first timer counter's initial value to a first timer counter's final value; and
starting the pulse width modulated period at the start of the first timer count using a pulse width modulation generator; and
delaying a start of a slope compensation by a first time from the starting of the pulse width modulated period;
wherein the delaying a start of a slope compensation by a first time from the starting of the pulse width modulated period comprises:
providing a second timer counter counting from a second timer counter's initial value that is offset from the first timer counter's initial value by the first time to a second timer counter's final value equal to a pulse width modulated period; and starting the slope compensation at the start of the first timer count.

2. The method as claimed in claim 1, wherein the difference between the first timer counter's initial value to the first timer counter's final value is equal to the pulse width modulated period.

3. The method as claimed in claim 1, wherein the difference between the second timer counter's initial value to the second timer counter's final value is equal to a pulse width modulated period.

4. The method as claimed in claim 1, wherein the delaying a start of a slope compensation by a first time from the starting of the pulse width modulated period comprises:

providing a delay-dedicated digital timer counter timer configured to delay the start of a slope compensation from the starting of the pulse width modulated period by the first time.

5. The method as claimed in claim 1, wherein the delaying a start of a slope compensation by a first time from the starting of the pulse width modulated period comprises:

delaying a start of a slope compensation by at least a duration of a required dead-time at the starting of the pulse width modulated period.

6. The method as claimed in claim 1, wherein the delaying a start of a slope compensation by a first time from the starting of the pulse width modulated period comprises:

delaying a start of a slope compensation by at least a value of the pulse width modulated period at which an instability in the peak current mode controlled power converter occurs.

7. The method as claimed in claim 6, wherein the value of the pulse width modulated period equals to 40%.

8. The method as claimed in claim 1, wherein the delaying a start of a slope compensation by a first time from the starting of the pulse width modulated period comprises:

determining operating conditions; and setting the first time in accordance with the determined operating conditions.

9. An apparatus for selective and adaptive slope compensation in peak current mode controlled power converter comprising:

a pulse width modulation generator configured to start a pulse width modulated period;

delay a start of a slope compensation by a first time from the starting of the pulse width modulated period; and a first timer counter counting from a first timer counter's initial value to a first timer counter's final value;

a second timer counter counting from a second timer counter's initial value, that is offset from the first timer counter's initial value by a first time, to a second timer counter's final value;

wherein the pulse width modulation generator is configured to start the slope compensation at the start of the first timer count.

10. The apparatus as claimed in claim 9, wherein the difference between the first timer counter's initial value to the first timer counter's final value is equal to the pulse width modulated period.

11. The apparatus as claimed in claim 9, wherein the difference between the second timer counter's initial value to the second timer counter's final value is equal to a pulse width modulated period.

12. The apparatus as claimed in claim 9, further comprising:

a delay-dedicated digital timer counter timer configured to delay the start of a slope compensation from the starting of the pulse width modulated period by the first time.

13. The apparatus as claimed in claim 9, wherein the pulse width modulation generator is configured to delay a start of a slope compensation by at least a duration of a required dead-time at the starting of the pulse width modulated period.

14. The apparatus as claimed in claim 9, wherein the pulse width modulation generator is configured to:

delay a start of a slope compensation by at least a value of the pulse width modulated period at which an instability in the peak current mode controlled power converter occurs.

15. The apparatus as claimed in claim 14, wherein the value of the pulse width modulated period equals to 40%.

16. The apparatus as claimed in claim 9, wherein the apparatus further comprises:

a controller configured to determine operating conditions; and set the first time in accordance with the determined operating conditions.

* * * * *